(12) United States Patent
Santurkar et al.

(10) Patent No.: US 7,391,229 B1
(45) Date of Patent: Jun. 24, 2008

(54) TECHNIQUES FOR SERIALLY TRANSMITTING ON-CHIP TERMINATION CONTROL SIGNALS

(75) Inventors: Vikram Santurkar, Fremont, CA (US); Hyun Mo Yi, Sunnyvale, CA (US); Quyen Doan, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 70 days.

(21) Appl. No.: 11/356,867

(22) Filed: Feb. 18, 2006

(51) Int. Cl.
*H03K 19/003* (2006.01)

(52) U.S. Cl. ............................. 326/30; 326/83; 326/86; 327/108

(58) Field of Classification Search ................. 326/30, 326/81–83, 86–87, 26; 327/108
See application file for complete search history.

(56) References Cited

U.S. PATENT DOCUMENTS

| | | | |
|---|---|---|---|
| 4,719,369 A | 1/1988 | Asano et al. | |
| 5,134,311 A | 7/1992 | Biber et al. | |
| 5,764,080 A | 6/1998 | Huang et al. | |
| 6,064,224 A | 5/2000 | Esch et al. | |
| 6,094,069 A * | 7/2000 | Magane et al. | 326/83 |
| 6,118,310 A | 9/2000 | Esch et al. | |
| 6,366,128 B1 | 4/2002 | Ghia et al. | |
| 6,384,621 B1 * | 5/2002 | Gibbs et al. | 326/30 |
| 6,433,579 B1 | 8/2002 | Wang et al. | |
| 6,445,245 B1 | 9/2002 | Schultz et al. | |
| 6,489,837 B2 * | 12/2002 | Schultz et al. | 327/541 |
| 6,586,964 B1 | 7/2003 | Kent et al. | |
| 6,590,413 B1 | 7/2003 | Yang | |
| 6,603,329 B1 | 8/2003 | Wang et al. | |
| 6,798,237 B1 | 9/2004 | Wang et al. | |
| 6,812,732 B1 | 11/2004 | Bui et al. | |
| 6,812,734 B1 | 11/2004 | Shumarayev et al. | |
| 6,836,144 B1 * | 12/2004 | Bui et al. | 326/32 |
| 6,888,369 B1 | 5/2005 | Wang et al. | |
| 6,888,370 B1 | 5/2005 | Luo et al. | |
| 6,980,022 B1 | 12/2005 | Shumarayev et al. | |
| 7,218,155 B1 | 5/2007 | Chang et al. | |
| 7,221,193 B1 * | 5/2007 | Wang et al. | 327/108 |
| 2002/0101278 A1 | 8/2002 | Schultz et al. | |
| 2004/0008054 A1 | 1/2004 | Lesea et al. | |

OTHER PUBLICATIONS

"Virtex-II Pro and Virtex-II Pro X FPGA User Guide," Mar. 23, 2005, pp. 223-240.

* cited by examiner

*Primary Examiner*—Rexford Barnie
*Assistant Examiner*—Christopher Lo
(74) *Attorney, Agent, or Firm*—Steven J. Cahill

(57) ABSTRACT

Techniques are provided for controlling on-chip termination (OCT) impedance using OCT calibration blocks that serially transmit OCT control signals to input/output (IO) blocks. The OCT control signals are serially transmitted through a shared conductor. An OCT calibration block can transmit OCT control signals to one or multiple IO blocks. The IO blocks can be programmed to select OCT control signals from one of the calibration blocks. Enable signals enable one or more of the IO blocks to receive the selected OCT control signals. The OCT control signals are used to control the on-chip termination impedance at one or more IO buffers.

24 Claims, 7 Drawing Sheets

TECHNIQUES FOR SERIALLY TRANSMITTING ON-CHIP TERMINATION CONTROL SIGNALS

BACKGROUND OF THE INVENTION

1. Field of the Invention

The present invention relates to electronic circuits, and more particularly, to techniques for transmitting on-chip termination control signals in serial to input/output blocks.

2. Description of the Related Art

Signal reflection can occur on transmission lines when there is a mismatch between the impedance of the transmission line and the impedance of the transmitter and/or receiver. The reflected signal can interfere with the transmitted signal, causing distortion and degrading signal integrity.

To solve this problem, transmission lines are resistively terminated by a matching impedance to minimize or eliminate signal reflection. Input/output (IO) pins on an integrated circuit package are often terminated by coupling external termination resistors to the appropriate IO pins. However, many integrated circuit packages require a large number of termination resistors, because they have a large number of IO pins. Therefore, it is becoming more common to resistively terminate transmission lines using on-chip termination (OCT) to reduce the number of external components.

In order to provide a precise resistance value for on-chip termination (OCT), an OCT calibration block is used to calibrate the resistance using an off-chip resistor as a reference value. The OCT calibration block generates an N-bit code and transmits the N-bit code in parallel to IO buffer regions. N number of parallel conductors are used to transmit the code from an OCT calibration block.

In a field programmable gate array (FPGA), M number of OCT calibration blocks are used to support input/output (IO) banks having M number of unique IO standards. Each of the OCT calibration blocks routes an N-bit code in parallel to all of the IO banks on the chip so that the IO buffers in each IO bank can be configured according to any of the IO standards. This scheme uses M×N number of conductors going all the way around the periphery of a chip.

Take, for example, an FPGA that has 10 OCT calibration blocks and 40 IO banks. If each OCT calibration block generates a 24-bit code (12-bits for the PMOS transistors and 12-bits for the NMOS transistors), 240 conductors are needed to transmit the 24-bit codes in parallel from each of the 10 OCT calibration blocks. Also, shield conductors may be used to isolate each set of codes. Such a large number of conductors would dramatically increase the peripheral area of the chip.

Therefore, it would be desirable to provide techniques for controlling on-chip termination that limit the number of routing conductors used to transmit the OCT control signals.

BRIEF SUMMARY OF THE INVENTION

The present invention provides techniques for controlling on-chip termination (OCT) impedance using OCT calibration blocks that serially transmit OCT control signals to input/output (IO) blocks. The OCT control signals are serially transmitted through a shared conductor. An OCT calibration block can transmit OCT control signals to one or multiple IO blocks.

The IO blocks can be programmed to select OCT control signals from one of the calibration blocks. Enable signals enable one or more of the IO blocks to receive the selected OCT control signals. The OCT control signals are used to control the on-chip termination impedance at one or more IO buffers.

Other objects, features, and advantages of the present invention will become apparent upon consideration of the following detailed description and the accompanying drawings, in which like reference designations represent like features throughout the figures.

DETAILED DESCRIPTION OF THE INVENTION

In theory, an OCT calibration block can be placed in each IO bank on a chip. Each of the OCT calibration blocks can generate an N-bit OCT code for configuring the IO buffers in a corresponding IO bank. This scheme limits the number of conductors used to route the OCT control signals to the IO buffers. However, placing one OCT calibration block in each IO bank on an integrated circuit increases its die size. The die size increase becomes very significant with increasing numbers of IO banks on an integrated circuit.

Assuming, for example, an FPGA has 40 IO banks, 40 OCT calibration blocks (one in each IO bank) can be used to reduce the number of conductors needed to transmit the OCT codes. 40 OCT calibration blocks on one FPGA requires a relatively large die area. If a particular user's design only requires 6 unique voltage standards, 34 of the OCT calibration blocks would be redundant, wasting most of the extra die area.

The present invention requires less OCT calibration blocks and less routing conductors to control the on-chip termination impedance. According to embodiments of the present invention, OCT control signal are transmitted in serial from OCT calibration blocks to IO blocks to reduce the number of routing conductors. Each OCT calibration block can control the on-chip termination in two or more IO banks to reduce the number of OCT calibration blocks. Further details of the present invention will now be described.

Figure 1:
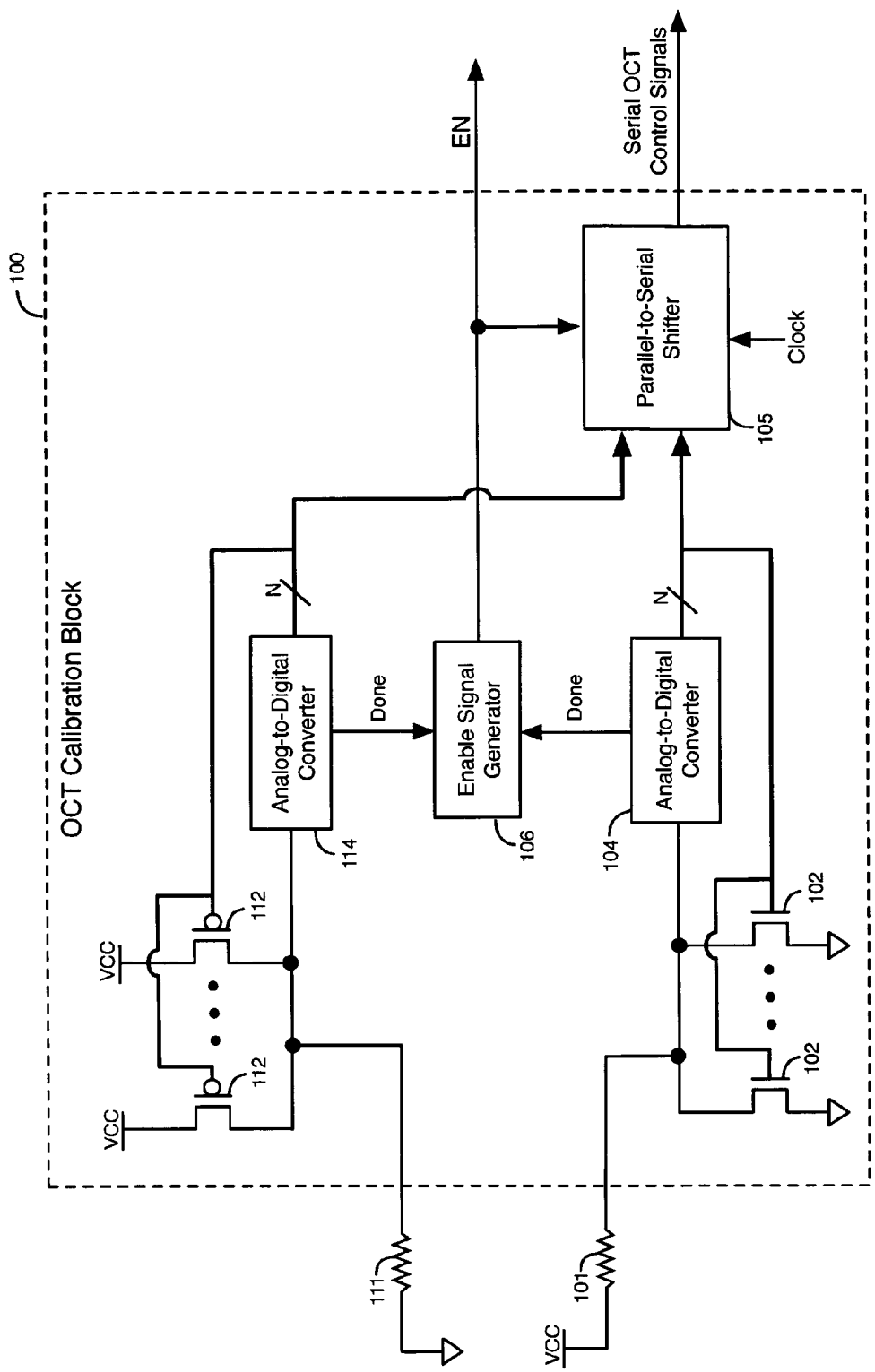
FIG. 1 is a block diagram of an on-chip termination (OCT) calibration block that generates serial control signals, according to an embodiment of the present invention.

FIG. 1 is a block diagram of an on-chip termination (OCT) calibration block 100 that generates serial OCT control signals, according to an embodiment of the present invention. OCT calibration block 100 is merely one example of an OCT calibration block that can generate serial OCT control signals according to the present invention. OCT calibration block 100 is described herein for illustrative purposes and is not intended to limit the scope of the present invention.

OCT calibration block 100 includes N-channel field-effect transistors 102 (e.g., NMOS), analog-to-digital converter (ADC) 104, P-channel field effect transistors 112 (e.g., PMOS), analog-to-digital converter (ADC) 114, parallel-to-serial shifter 105, and enable signal generator 106. The drains of N-channel transistors 102 are coupled to an off-chip resistor 101. The drains of P-channel transistors 112 are coupled to an off-chip resistor 111.

An input of ADC 104 is coupled to the drains of N-channel transistors 102. ADC 104 generates a digitally encoded output that is based on the divided down voltage between resistor 101 and N-channel transistors 102. The digitally encoded output has N parallel bits (i.e., N parallel signals) that feed back to selectively enable N-channel transistors 102. When transistors 102 and ADC 104 reach equilibrium, ADC 104 generates a Done signal that is transmitted to an input of enable signal generator 106.

An input of ADC 114 is coupled to the drains of P-channel transistors 112. ADC 114 generates a digitally encoded output that is based on the divided down voltage between resistor 111 and N-channel transistors 112. The digitally encoded output has N parallel bits that feed back to selectively enable P-channel transistors 112. When transistors 112 and ADC 114 reach equilibrium, ADC 114 generates a Done signal that is transmitted to an input of enable signal generator 106. A user can select the resistance of resistors 101 and 111 to control the on-chip termination impedance at particular IO pins.

The N-bit digitally encoded outputs of ADC 104 and ADC 114 are also provided to inputs of parallel-to-serial shifter 105. Parallel-to-serial shifter 105 converts the N-bit digitally encoded outputs of ADC 104 and ADC 114 into a serial stream of digitally-encoded OCT control signals. The N-bit digitally encoded outputs of ADCs 104 and 114 are multiplexed within shifter 105 to control which set of parallel encoded bits is converted to serial at a given time.

Parallel-to-serial shifter 105 converts the digitally encoded, parallel output signals of ADCs 104 and 114 into a serial stream in response to a clock signal and an enable signal EN. The enable signal EN is generated by enable signal generator 106. Enable signal generator 106 causes the enable signal EN to transition to a logic high when it receives Done signals from both ADCs 104 and 114. When EN is high, parallel-to-serial shifter 105 outputs a serial stream of OCT control signals.

The OCT control signals are used to control the on-chip termination impedance at one or more input/output (IO) buffers. The digitally encoded bits generated by ADC 104 are used to selectively enable pull-down N-channel transistors in one or more IO buffers, and the digitally encoded bits generated by ADC 114 are used to selectively enable pull-up P-channel transistors in one or more IO buffers.

Figure 2:
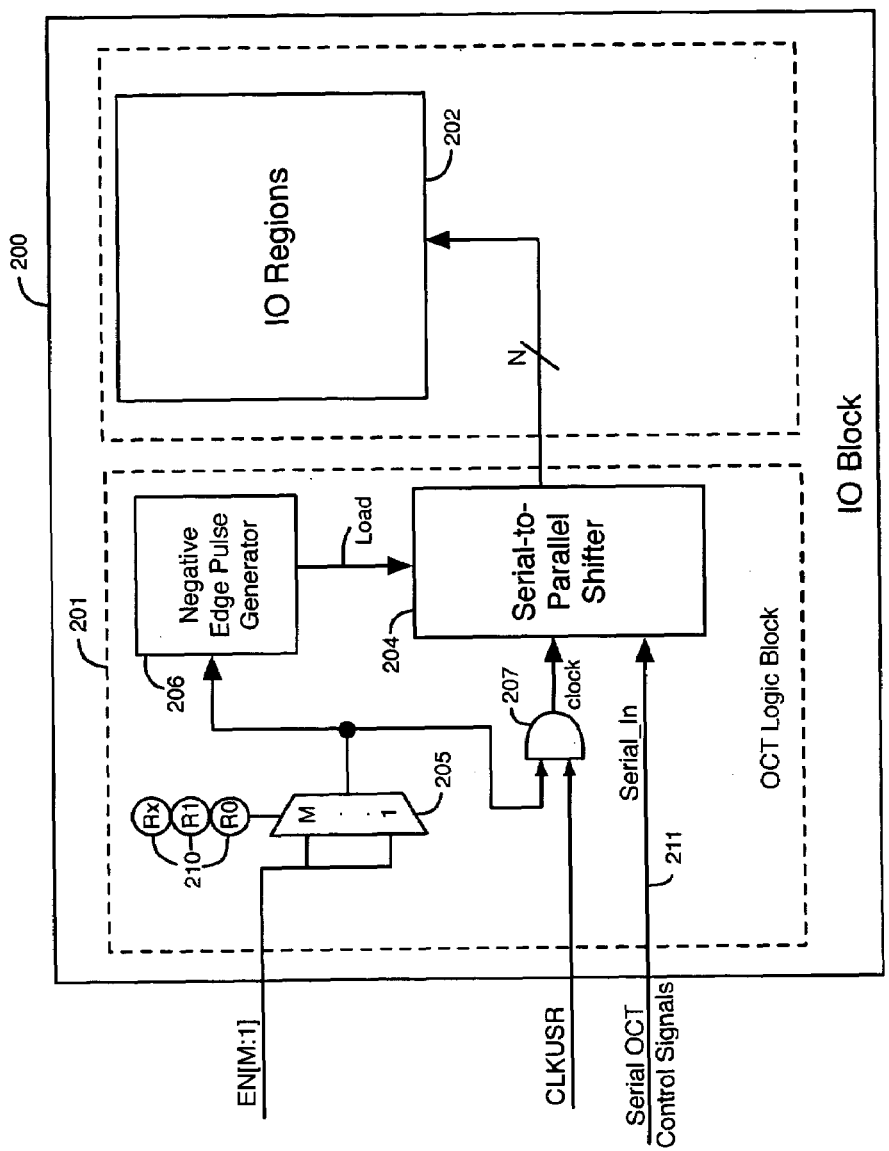
FIG. 2 is a block diagram of an input/output (IO) block that receives serial OCT control signals, according to an embodiment of the present invention.

FIG. 2 is a block diagram of an input/output (IO) block 200 that receives serial OCT control signals, according to an embodiment of the present invention. IO block 200 includes OCT logic block 201 and IO regions 202. IO regions 202 include one or more IO buffers. IO regions 202 typically include several IO buffers. Each IO buffer typically has pull-up and pull-down transistors that are coupled to one or more IO pins (e.g., single-ended or differential pins). An IO bank typically includes multiple IO blocks.

There are M number of OCT calibration blocks on the integrated circuit. OCT logic block 201 receives M number of enable signals EN[M:1], one from each of the OCT calibration blocks. OCT logic block 201 also receives N number of OCT control signals from one of the OCT calibration blocks. The N control signals are transmitted from an OCT calibration block to OCT logic block 201 in serial through a single conductor 211. In addition, OCT logic block 201 receives a user clock signal CLKUSR. According to another embodiment of the present invention, OCT control signals are routed from the OCT calibration blocks to the IO banks in serial, the OCT control signals are converted from serial to parallel within the IO banks, and then the OCT control signals are routed in parallel to the IO blocks.

OCT logic block 201 includes multiplexer 205, negative edge pulse generator 206, clock gating AND gate 207, and serial-to-parallel shifter 204. Multiplexer 205 has M number of inputs. The M inputs of multiplexer 205 receive the M enable signals EN[M:1] from the OCT calibration blocks.

The select inputs of multiplexer 205 are coupled to receive select signals from memory 210 (e.g., CRAM bits) on the integrated circuit (or off chip). The select signals determine which of the enable signals EN[M:1] multiplexer 205 passes to its output. In FIG. 2, X select signals are used to control the output of multiplexer 205, where $2^X$=M. For example, if M=8, only 3 select signals ($2^3$=8) are needed to control the output of multiplexer 205. IO block 200 can be programmed by memory 210 to select a set of OCT control signals from a particular OCT calibration block to control the on-chip termination impedance in one or more IO buffers.

When the select signals cause multiplexer 205 to pass an enable signal that is low to its output, OCT logic block 201 is disabled. When the select signals cause multiplexer 205 to pass an enable signal that is high to its output, OCT logic block 201 is enabled to control the on-chip termination in IO regions 202.

Serial-to-parallel shifter 204 contains a serial-to-parallel converter (e.g., a shift register). Serial-to-parallel shifter 204 converts the N-bit serially transmitted OCT control signals into N parallel OCT control signals. The N parallel OCT control signals are transmitted to IO regions 202 to control the on-chip termination impedance of one or more IO buffers.

When the output of multiplexer 205 is high, AND gate 207 passes the clock signal CLKUSR to serial-to-parallel shifter 204, enabling serial-to-parallel shifter 204 to shift the serial OCT control signals into parallel signals. When the output of multiplexer 205 is low, AND gate 207 blocks the clock signal CLKUSR from controlling serial-to-parallel shifter 204. As a result, when the output of multiplexer 205 is low, serial-to-parallel shifter 204 does not shift the serial OCT control signals.

Negative edge pulse generator 206 provides a logic high output to serial-to-parallel shifter 204 when the output of multiplexer 205 is low. When the output of multiplexer 205 is high, negative edge pulse generator 206 generates a negative edge Load pulse at its output (i.e., a high-to-low transition). The negative edge pulse is provided to an input of serial-to-parallel shifter 204.

Serial-to-parallel shifter 204 begins to load the serial OCT control signals into N parallel output conductors in response to the negative edge Load pulse from generator 206 and the clock signal CLKUSR from AND gate 207. Serial-to-parallel shifter 204 uses CLKUSR to determine the period of the individual OCT control signals so that they can be accurately separated into parallel control signals.

Figure 3:
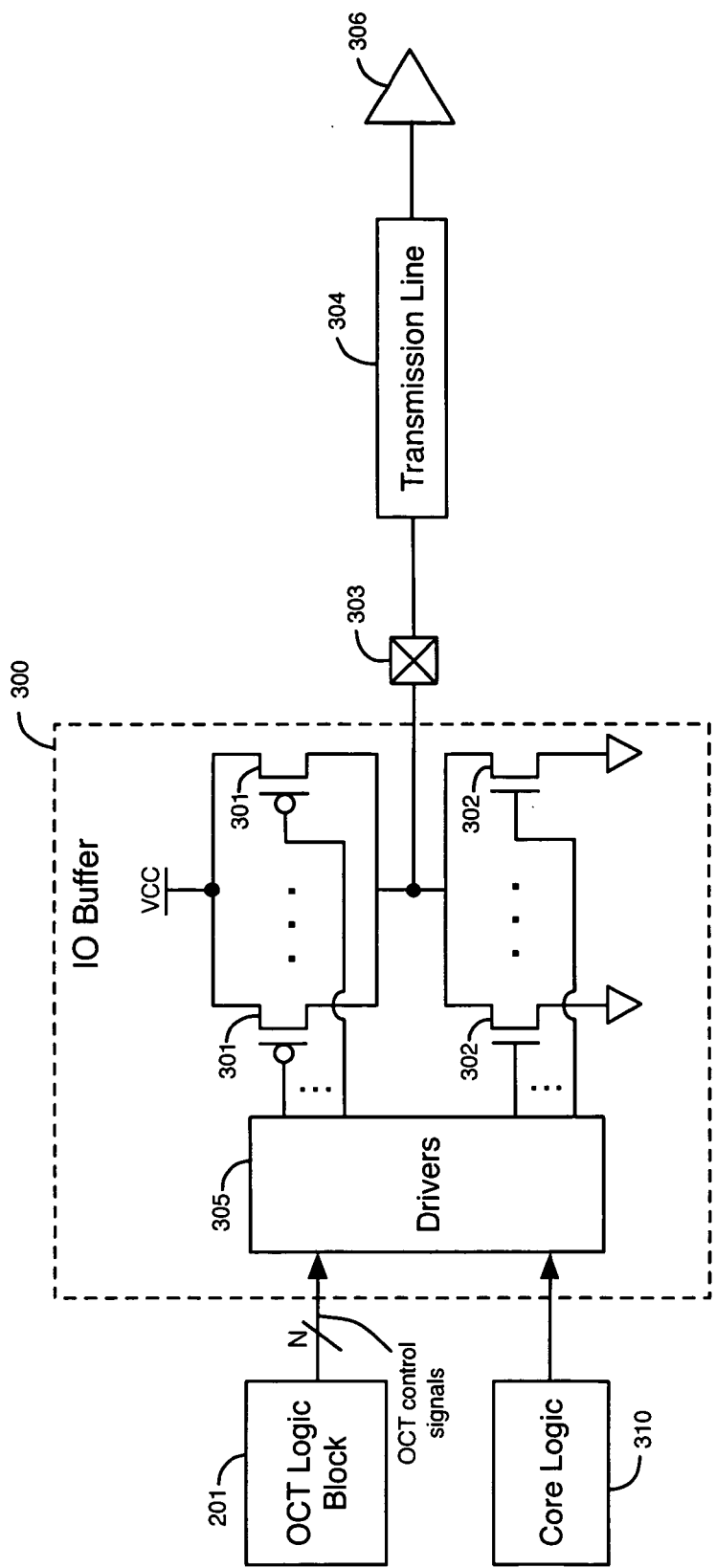
FIG. 3 illustrates an IO buffer that provides on-chip termination at an IO pin, according to an embodiment of the present invention.

FIG. 3 illustrates a specific example of an IO buffer 300 that can provide on-chip termination impedance at an IO pin 303, according to an embodiment of the present invention. OCT logic block 201 typically transmits N parallel OCT control signals to several IO buffers. Only one IO buffer 300 is illustrated in FIG. 3 to simplify the drawing.

The N parallel OCT control signals are transmitted to drivers 305. Drivers 305 drive a set of parallel coupled P-channel transistors 301 and a set of parallel coupled N-channel transistors 302. Each of the P-channel and N-channel transistors are different sizes (e.g., 1×, 2×, 4×, 8×, 16×, 32×, 64×, 128×, etc.). To control the termination impedance at pin 303, the N-bit OCT control signals generated by ADC 114 selectively enable P-channel transistors 301, and the N-bit OCT control signals generated by ADC 104 selectively enable N-channel transistors 302.

The enabled P-channel and N-channel transistors are turned on and off in response to data signals from core logic 310. Core logic 310 generates signals that cause the enabled P-channel and N-channel transistors to turn on to drive output data signals to pin 303. The data signals are sent across transmission line 304 to a receiver 306. The impedance of the selectively enabled transistors 301-302 should match the impedance of transmission line 304 in order to prevent signal reflection and the resulting signal distortion. The OCT calibration block can generate binary values of the OCT control signals that will generate a matching impedance at pin 303 by selectively enabling transistors 301-302. According to various embodiments of the present invention, OCT control signals can be used to control the on-chip termination impedance of input buffers, output buffers, buffers coupled to single-ended pins, and buffers coupled to differential pins.

Figure 4:
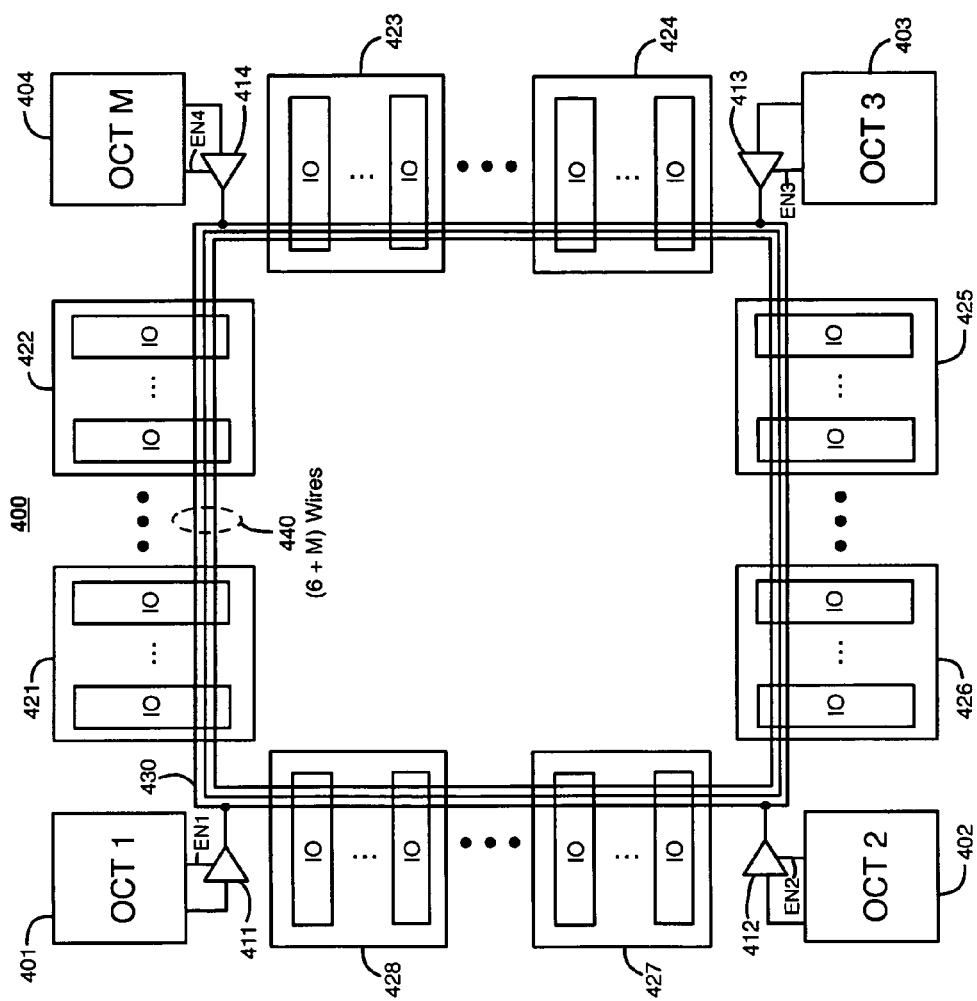
FIG. 4 is a partial diagram of an integrated circuit containing a conductor that serially transmits OCT control signals, according to an embodiment of the present invention.

FIG. 4 is a partial diagram of an integrated circuit (IC) 400 containing OCT calibration blocks that transmit OCT control signals in serial to IO blocks, according to an embodiment of the present invention. Four OCT calibration blocks 401-404 in IC 400 are shown in FIG. 4. However, IC 400 can have any number of OCT calibration blocks. For example, IC 400 can have 8 OCT calibration blocks.

IC 400 also has several IO banks. Each IO bank contains multiple IO blocks. Eight IO banks 421-428 are shown in FIG. 4. However, IC 400 can have any number of IO banks and IO blocks. The IO blocks are labeled IO in each IO bank in FIG. 4. Each IO block typically has one or more IO buffers. The IO buffers can include transistors that provide on-chip termination and impedance matching to one or more IO pins. The IO pins can be used as input pins, output pins, or both.

The OCT calibration blocks in IC 400 (including OCT calibration blocks 401-404) transmit N-bit OCT control signals to the IO blocks (including IO blocks in banks 421-428) in serial through one signal line conductor 430. Conductor 430 is routed around the periphery of IC 400 along all four sides of the chip, as shown in FIG. 4.

Tristate drivers 411-414, etc. selectively drive the N-bit OCT control signals from the OCT calibration blocks 401-404, etc. to conductor 430. Conductor 430 is coupled to each of the IO blocks on IC 400. Any of the OCT calibration blocks on IC 400 can control the on-chip termination impedance in any of the IO blocks on IC 400 by serially transmitting OCT control signals through conductor 430.

Because only one conductor 430 is used for transmitting all of the OCT control signals on IC 400, only one OCT calibration block can send OCT control signals to one or more IO blocks at one time. A set of enable signals EN[M:1] determines which OCT calibration block can transmit OCT control signals through conductor 430 at any particular time. One of the enable signals EN1-EN4 is coupled to the tristate input of each of the tristate drivers 411-414, respectively. For example, the first enable signal EN1 controls the tristate input of tristate driver 411. When the first enable signal EN1 is high, all of the other enable signals EN2-EN4 are low, and only OCT calibration block 401 can drive OCT control signals to the IO blocks through tristate driver 411 and conductor 430.

The enable signals are routed to the IO blocks on IC 400 in parallel. Conductors that transmit the enable signals EN[M:1] are routed around the periphery of IC 400 to each of the IO blocks. A conductor that routes clock signal CLKUSR and shielding conductors are also routed around the periphery of IC 400. The set of conductors 440 shown in FIG. 4 includes conductor 430, M enable signal EN[M:1] conductors, a CLKUSR conductor, and 4 shielding conductors, for a total of (6+M) conductors. Conductors 440 can be routed around the periphery of IC 400 in any desired configuration. One example configuration for conductors 440 is given below:

1 shield|conductor 430|1 shield|1 Clock|1 shield|M enable conductors|1 shield

In the embodiment of FIG. 4, the number of conductors used to transmit the OCT control signals from the OCT calibration blocks to the IO blocks is significantly reduced. For example, a total of 64 conductors are needed to transmit parallel 8-bit OCT control signals from 8 OCT calibration blocks to 8 IO banks through 8 sets of parallel conductors. On the other hand, IC 400 has one conductor 430 for serially transmitting the OCT control signals from M OCT calibration blocks to any number of IO banks, plus M enable signal conductors and one clock conductor.

Each IO buffer is configured to drive output signals and/or receive input signals according to an IO standard. Each IO buffer is generally designed to operate with a particular supply voltage value. The IO buffers on an integrated circuit do not necessarily use the same IO standard or the same supply voltage. An integrated circuit can have multiple types of IO buffers that are each designed to operate with a different IO standard and/or supply voltage.

Each type of IO buffer typically requires a unique set of OCT control signals. One OCT calibration block can control the on-chip termination of multiple IO buffers that each use the same supply voltage and the same IO standard. According to some embodiments of the present invention, one OCT calibration block can serially transmit OCT control signals to multiple IO blocks and multiple IO banks that contain the same type of IO buffers.

As an example, IC 400 can have IO blocks that are grouped into 4 types. The IO buffers in the first type of IO block are driven by a 3 volt supply. The IO buffers in the second type of IO block are driven by a 2.5 volt supply. The IO buffers in the third type of IO block are driven by a 1.8 volt supply. The IO buffers in the fourth type of IO block are driven by a 1.5 volt supply. Four OCT calibration blocks 401-404 are used to provide the required OCT control signals for each of the four types of IO blocks. For example, OCT calibration block 401 can serially drive OCT control signals to two or more IO banks having IO buffers that are driven by a 3 volt supply.

The present invention enables the serial transmission of N-bit OCT control signals from one OCT calibration block to all of the IO banks and IO blocks on an IC that use the same supply voltage. Because one OCT calibration block can control the IO buffers in multiple IO banks and multiple IO blocks, the present invention can significantly reduce the number of OCT calibration blocks that are needed on a chip.

Figure 5:
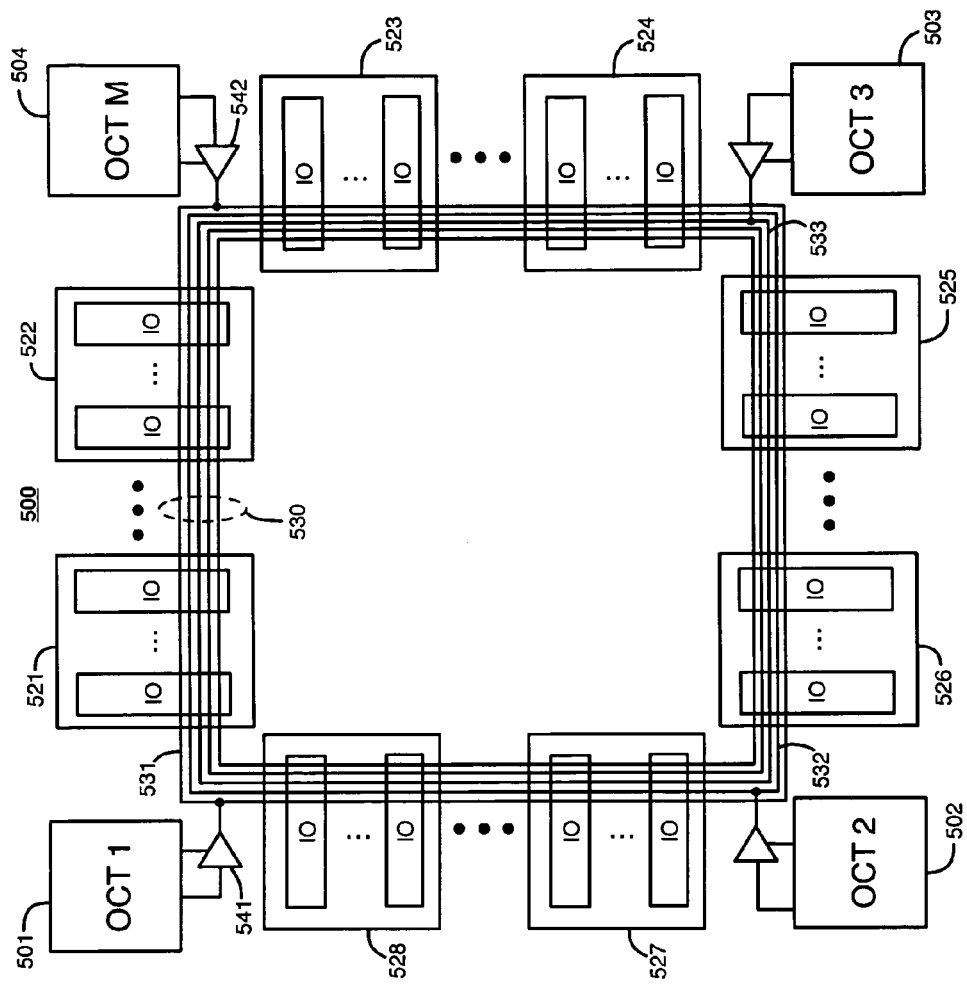
FIG. 5 is a partial diagram of an integrated circuit containing multiple conductors that serially transmit OCT control signals, according to yet another embodiment of the present invention.

FIG. 5 is a partial diagram of an integrated circuit (IC) 500 containing OCT calibration blocks that transmit OCT control signal in serial to IO blocks, according to another embodiment of the present invention. Four OCT calibration blocks 501-504 in IC 500 are shown in FIG. 5 for illustrative purposes. However, IC 500 can have any number of OCT calibration blocks (e.g., 8). IC 500 can also have any suitable number of IO banks. Eight IO banks 521-528 are shown in FIG. 5 for illustrative purposes. Each IO bank has multiple IO blocks, and each IO block has one or more IO buffers.

In IC 500, the OCT calibration blocks transmit N-bit OCT control signals to the blocks in serial. Some of the OCT calibration blocks in IC 500 share a single conductor to serially transmit their OCT control signals to the IO blocks. For example, OCT calibration blocks 501 and 504 both share conductor 531. Conductor 531 is one of a set of conductors 530 that are routed around the periphery of the chip through each of the IO blocks. OCT calibration blocks 501 and 504 can serially transmit their output OCT control signals through conductor 531 at different times. A set of enable signals controls the traffic through conductor 531 by controlling the tristate inputs of tristate drivers 541 and 542 and the serial-to-parallel shifters in the IO blocks, as described above.

Some of the OCT calibration blocks on IC 500 transmit their output OCT control signals to the IO blocks in serial through separate conductors. For example, OCT calibration block 502 serially transmits its OCT control signals to the IO blocks through conductor 532. OCT calibration block 502 may share conductor 532 with other OCT calibration blocks.

As another example, OCT calibration block 503 serially transmits its OCT control signals to the IO blocks through conductor 533. OCT calibration block 503 may share conductor 533 with other OCT calibration blocks. Thus, IC 500 has multiple conductors that are used to serially transmit OCT controls signals to the IO blocks, such as the IO blocks in IO banks 521-528.

In order to enable each IO block to be programmable to receive OCT control signals from any of OCT calibration blocks 501-504, serial OCT control signals transmitted along conductors 531-533 can be multiplexed by an additional multiplexer in each IO block before being transmitted to the input of serial-to-parallel shifter 204. The additional multiplexer can be controlled by CRAM bits or other signals.

The set of conductors 530 shown in FIG. 5 includes conductors 531-533, a set of enable signal conductors, a CLKUSR conductor, and a set of shielding conductors. Conductors 530 can be routed around the periphery of IC 500 in any desired configuration. In the embodiment of FIG. 5, the number of conductors used to transmit the OCT control signals from the OCT calibration blocks to the IO blocks is reduced. As little as three conductors 531-533 are used to serially transmit the OCT control signals to the IO blocks, plus a set of enable conductors and one clock conductor. ICs that route OCT control signals from the OCT calibration blocks to the IO blocks in parallel require significantly more routing conductors.

Each of the OCT calibration blocks on IC 500, including blocks 501-504, can drive OCT control signals to multiple IO blocks and multiple IO banks. For example, OCT calibration block 501 can drive OCT control signals to multiple IO banks that have IO buffers driven by a 1.8 volt supply voltage. Thus, the embodiment of FIG. 5 can also significantly reduce the number of OCT calibration blocks needed on a chip to control the on-chip termination impedance.

In FIGS. 4 and 5, the OCT calibration blocks are located on the same IC as the IO blocks. According to further embodiments of the present invention, the OCT calibration blocks are located on a first IC, and the IO blocks are located on a second IC. The OCT controls signals are transmitted from the first IC to the second IC and routed through the second IC in serial to the IO blocks.

Figure 6:
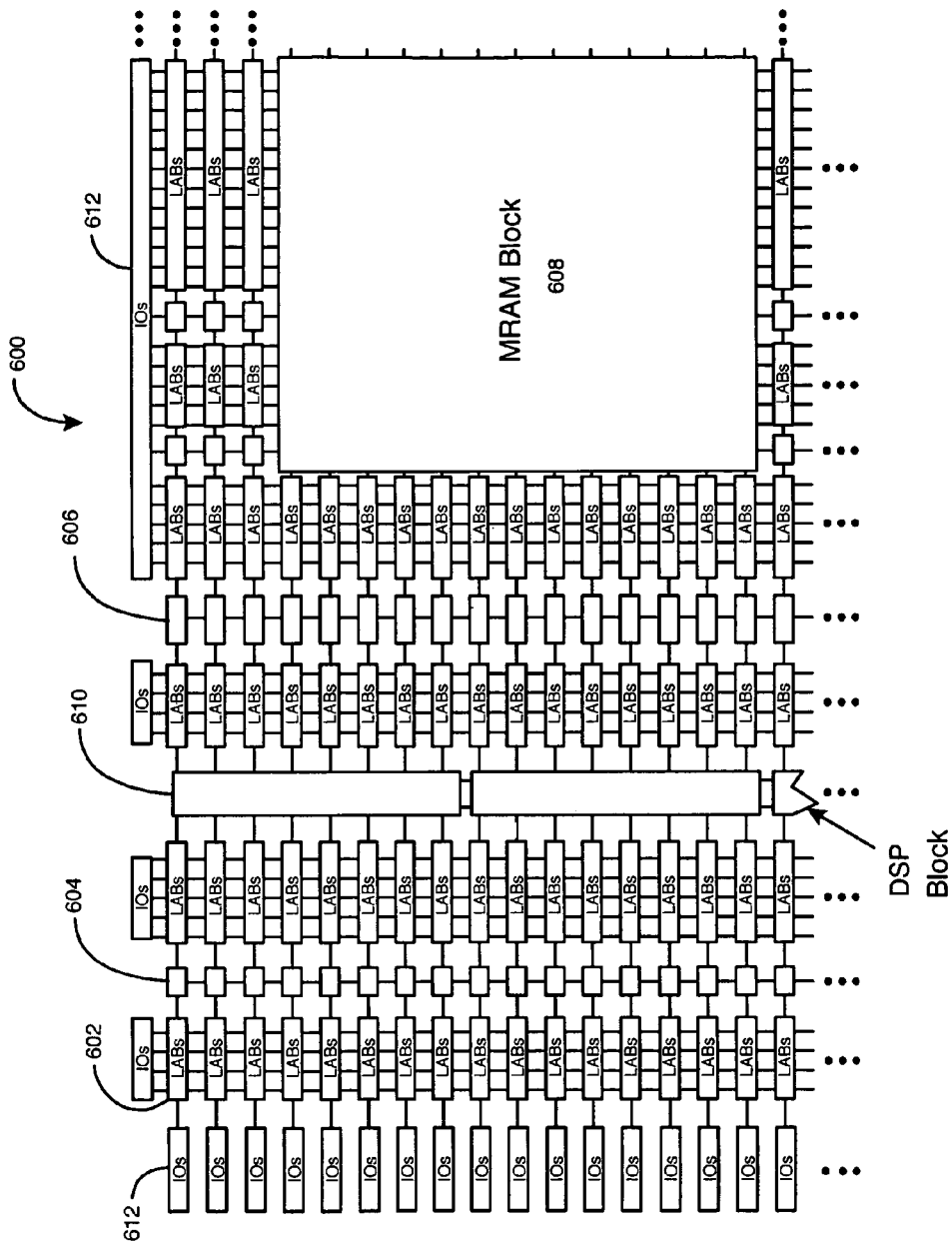
FIG. 6 is a simplified block diagram of a field programmable gate array that can embody the techniques of the present invention.

FIG. 6 is a simplified partial block diagram of an FPGA 600 that can include aspects of the present invention. FPGA 600 is merely one example of an integrated circuit that can include features of the present invention. It should be understood that the present invention can be applied to numerous types of circuits such as field programmable gate arrays (FPGAs), programmable logic devices (PLDs), complex programmable logic devices (CPLDs), programmable logic arrays (PLAs), and application specific integrated circuits (ASICs).

FPGA 600 includes a two-dimensional array of programmable logic array blocks (or LABs) 602 that are interconnected by a network of column and row interconnect conductors of varying length and speed. LABs 602 include multiple (e.g., 10) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 600 also includes a distributed memory structure including RAM blocks of varying sizes provided throughout the array. The RAM blocks include, for example, blocks 604, blocks 606, and block 608. These memory blocks can also include shift registers and FIFO buffers.

FPGA 600 further includes digital signal processing (DSP) blocks 610 that can implement, for example, multipliers with add or subtract features. I/O blocks (IOs) 612 located, in this example, around the periphery of the chip support numerous single-ended and differential input/output standards. It is to be understood that FPGA 600 is described herein for illustrative purposes only and that the present invention can be implemented in many different types of PLDs, FPGAs, and the like.

Figure 7:
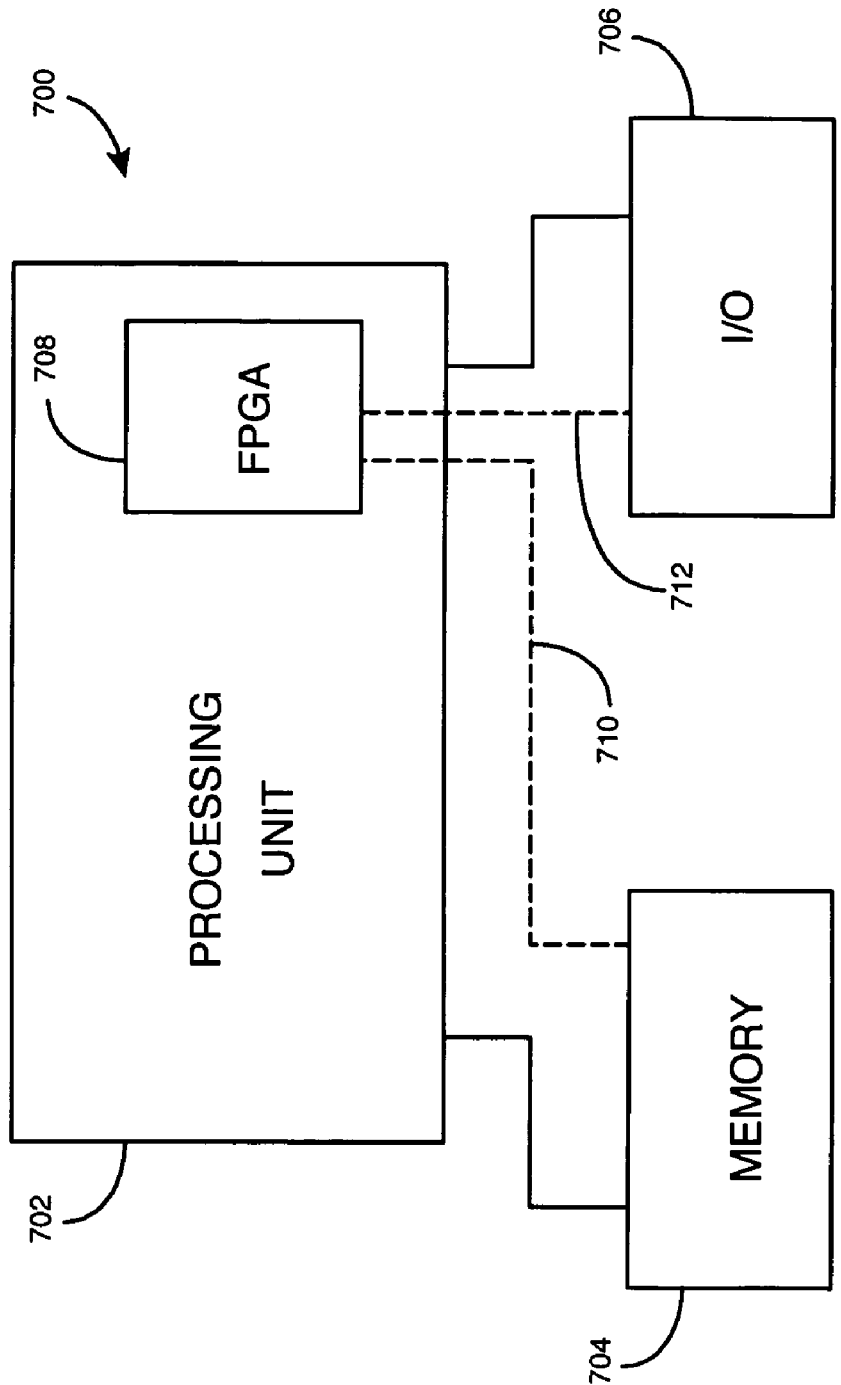
FIG. 7 is a block diagram of an electronic system that can implement embodiments of the present invention.

The present invention can also be implemented in a system that has an FPGA as one of several components. FIG. 7 shows a block diagram of an exemplary digital system 700 that can embody techniques of the present invention. System 700 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 700 can be provided on a single board, on multiple boards, or within multiple enclosures.

System 700 includes a processing unit 702, a memory unit 704 and an I/O unit 706 interconnected together by one or more buses. According to this exemplary embodiment, an FPGA 708 is embedded in processing unit 702. FPGA 708 can serve many different purposes within the system in FIG. 7. FPGA 708 can, for example, be a logical building block of processing unit 702, supporting its internal and external operations. FPGA 708 is programmed to implement the logical functions necessary to carry on its particular role in system operation. FPGA 708 can be specially coupled to memory 704 through connection 710 and to I/O unit 706 through connection 712.

Processing unit 702 can direct data to an appropriate system component for processing or storage, execute a program stored in memory 704 or receive and transmit data via I/O unit 706, or other similar function. Processing unit 702 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 708 can control the logical operations of the system. As another example, FPGA 708 acts as a reconfigurable processor, which can be reprogrammed as needed to handle a particular computing task. Alternately, FPGA 708 can itself include an embedded microprocessor. Memory unit 704 can be a random access memory (RAM), read only memory (ROM), fixed or flexible disk media, PC Card flash disk memory, tape, or any other storage means, or any combination of these storage means.

While the present invention has been described herein with reference to particular embodiments thereof, a latitude of modification, various changes, and substitutions are intended in the present invention. For example, some features of the present invention can be employed without using other features. Also, many modifications can be made to the disclosed embodiments, without departing from the essential scope and spirit of the present invention. It is intended that the invention not be limited to the particular embodiments disclosed, but that the invention will include all embodiments and equivalents falling within the scope of the claims.

The invention claimed is:

1. A digital system comprising:
   a first calibration block that outputs a first set of control signals;
   a second calibration block that outputs a second set of control signals;
   a first conductor that serially transmits the first set of control signals and the second set of control signals;
   a first input/output block that is programmable to select one set of the first and the second sets of control signals to control an on-chip termination impedance of at least one first buffer; and
   a multiplexer that receives a first enable signal from the first calibration block and a second enable signal from the second calibration block, wherein the multiplexer selects one of the first and the second enable signals in response to at least one select signal to enable control of the on-chip termination impedance.

2. The digital system defined in claim 1 further comprising:
   a second input/output block that is programmable to select one set of the first and the second sets of control signals to control an on-chip termination impedance of at least one second buffer.

3. The digital system defined in claim 2 wherein first input/output block receives the set of control signals selected by the first input/output block in serial from the first conductor, and the second input/output block receives the set of control signals selected by the second input/output block in serial from the first conductor.

4. The digital system defined in claim 2 wherein the first and the second input/output blocks receive a set of enable signals that determines which input/output block is enabled to control an on-chip termination impedance in response to control signals transmitted along the first conductor.

5. The digital system defined in claim 1 further comprising:
   a tristate driver coupled to the first calibration block, the tristate driver receiving the first set of control signals from the first calibration block at a first input and an enable signal at a second tristate input, wherein an output of the tristate driver is coupled to the first conductor.

6. The digital system defined in claim 2 further comprising:
   a third input/output block that is programmable to select one set of the first and the second sets of control signals to control an on-chip termination impedance of at least one third buffer.

7. The digital system defined in claim 1 wherein the first input/output block receives a clock signal at an input.

8. A digital system comprising:
   a first calibration block that outputs a first set of control signals;
   a second calibration block that outputs a second set of control signals;
   a first conductor that serially transmits the first set of control signals and the second set of control signals;
   a first input/output block that is programmable to select one set of the first and the second sets of control signals to control an on-chip termination impedance of at least one first buffer;
   a second input/output block that is programmable to select one set of the first and the second sets of control signals to control an on-chip termination impedance of at least one second buffer;
   a third calibration block that outputs a third set of control signals, wherein the third set of control signals are serially transmitted through the first conductor; and
   a third input/output block that is programmable to select one set of the first, the second, and the third sets of control signals to control an on-chip termination impedance of at least one third buffer, wherein third input/output block receives the set of control signals selected by the third input/output block in serial from the first conductor.

9. A digital system comprising:
   a first calibration block that outputs a first set of control signals;
   a second calibration block that outputs a second set of control signals;
   a first conductor that serially transmits the first set of control signals and the second set of control signals;
   a first input/output block that is programmable to select one set of the first and the second sets of control signals to control an on-chip termination impedance of at least one first buffer;
   a second input/output block that is programmable to select one set of the first and the second sets of control signals to control an on-chip termination impedance of at least one second buffer;
   a third calibration block that outputs a third set of control signals, wherein the third set of control signals are serially transmitted through a second conductor; and
   a third input/output block that controls an on-chip termination impedance of at least one third buffer in response to the third set of control signals, wherein the first, the second, and the third input/output blocks are all on one integrated circuit.

10. The digital system defined in claim 1 wherein the first input/output block further comprises a serial-to-parallel shifter that converts the first control signals from a serial control sequence into a parallel control sequence, the serial-to-parallel shifter transmitting the parallel control sequence to the at least one first buffer.

11. A digital system comprising:
    a first calibration block that outputs first control signals for selectively enabling pull-up transistors in a buffer and second control signals for selectively enabling pull-down transistors in the buffer;
    a second calibration block that outputs third control signals for selectively enabling the pull-up transistors in the buffer and fourth control signals for selectively enabling the pull-down transistors in the buffer;

a conductor that serially transmits the first control signals, the second control signals, the third control signals, and the fourth control signals;

an input/output block that is programmable to select control signals from the conductor to control an on-chip termination impedance of the buffer.

12. The digital system defined in claim 1 wherein the first and the second calibration blocks and the first input/output block are on a field programmable gate array.

13. A method for controlling an on-chip termination impedance on an integrated circuit, the method comprising:

generating a first set of control signals at a first calibration block;

generating a second set of control signals at a second calibration block;

serially transmitting the first set of control signals through a first conductor;

serially transmitting the second set of control signals through the first conductor;

programmably selecting one set of the first and the second sets of control signals to control an on-chip termination impedance of at least one first buffer;

generating a third set of control signals at a third calibration block;

serially transmitting the third set of control signals through the first conductor; and programmably selecting one set of the first, the second, and the third sets of control signals to control an on-chip termination impedance of at least one second buffer, wherein the set of control signals selected to control the on-chip termination impedance of the at least one second buffer are received in serial at an input/output block from the first conductor.

14. The method defined in claim 13 further comprising:
multiplexing a set of enable signals to determine when to control the on-chip termination impedance of the at least one first buffer using the selected set of control signals.

15. The method defined in claim 13 wherein the control signals selected to control the on-chip termination impedance of the at least one first buffer are received in serial at an input/output block from the first conductor.

16. The method defined in claim 13 further comprising:
controlling when the first set of control signals are serially transmitted through the first conductor using a first enable signal; and
controlling when the second set of control signals are serially transmitted through the first conductor using a second enable signal.

17. The method defined in claim 13 further comprising:
programmably selecting one set of the first and the second sets of control signals to control an on-chip termination impedance of at least one third buffer.

18. A method for controlling an on-chip termination impedance on an integrated circuit, the method comprising:
generating first pull-up and first pull-down control signals at a first calibration block;
generating second pull-up and second pull-down control signals at a second calibration block;
serially transmitting the first pull-up control signals through a conductor;
serially transmitting the second pull-up control signals through the conductor;
serially transmitting the first pull-down control signals through the conductor;
serially transmitting the second pull-down control signals through the conductor; and
selecting control signals from the conductor to control an on-chip termination impedance of at least one buffer.

19. An integrated circuit comprising:
a first calibration block that generates first pull-up and first pull-down control signals;
a second calibration block that generates second pull-up and second pull-down control signals;
a first signal line that transmits the first pull-up, the first pull-down, the second pull-up, and the second pull-down control signals in serial; and
a first input/output block for controlling an on-chip termination impedance at a first pin of the integrated circuit in response to control signals selected from the first signal line.

20. The integrated circuit defined in claim 19 further comprising:
a second input/output block for controlling an on-chip termination impedance at a second pin of the integrated circuit in response to control signals selected from the first signal line.

21. The integrated circuit defined in claim 20 further comprising:
a third calibration block that generates third control signals, wherein the third control signals are serially transmitted through the first signal line; and
a third input/output block for controlling an on-chip termination impedance at a third pin of the integrated circuit in response to control signals selected from the first signal line.

22. An integrated circuit comprising:
a first calibration block that generates first control signals and a first enable signal, wherein the first calibration block comprises a first analog-to-digital converter and a second analog-to-digital converter;
a second calibration block that generates second control signals and a second enable signal, wherein the second calibration block comprises a third analog-to-digital converter and a fourth analog-to-digital converter;
a signal line that transmits the first and the second control signals in serial;
a means for selecting control signals transmitted through the signal line in response to at least one of the first and the second enable signals; and
a buffer for controlling an on-chip termination impedance at a pin of the integrated circuit in response to the set of control signals selected by the means for selecting.

23. The integrated circuit defined in claim 20 further comprising:
a third calibration block that generates third control signals;
a second signal line for serially transmitting the third control signals; and
a third input/output block for controlling an on-chip termination impedance at a third pin of the integrated circuit in response to the third control signals.

24. The integrated circuit defined in claim 19 wherein all on-chip termination control signals on the integrated circuit are serially transmitted through the first signal line.

* * * * *